(12) United States Patent
de Potzolli

(10) Patent No.: US 6,221,412 B1
(45) Date of Patent: *Apr. 24, 2001

(54) USE OF CAROTENOIDS AS STABILIZER OF THE COLOR OF RIBOFLAVIN AND RIBOFLAVIN DERIVATIVES

(75) Inventor: Bernd de Potzolli, Bad Dürkheim (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/073,956

(22) Filed: May 7, 1998

(30) Foreign Application Priority Data

May 16, 1997 (DE) .............................. 197 20 802

(51) Int. Cl.[7] ..................................................... A23L 1/272
(52) U.S. Cl. ........................... 426/268; 426/262; 426/580
(58) Field of Search .................................. 426/262, 268, 426/250, 540, 580

(56) References Cited

U.S. PATENT DOCUMENTS

| 4,574,086 | 3/1986 | Shackelford | 426/62 |
|---|---|---|---|
| 4,689,245 | 8/1987 | Kosikowski et al. | 426/72 |
| 5,336,510 | 8/1994 | Chang | 426/72 |

FOREIGN PATENT DOCUMENTS

| 46038591 | 12/1966 | (JP) . |
|---|---|---|
| 5511752 | 2/1979 | (JP) . |
| 59113860 | 6/1984 | (JP) . |
| 94/06415 | 3/1994 | (WO) . |
| 97/15201 | 5/1997 | (WO) . |

OTHER PUBLICATIONS

Jensen, R. *Handbook of Milk Compositions*, pp. 718–720, Academic Press, 1995.*

Machlin, "Handbook of vitamins, 2nd Ed.", 1990, pp. 288–290.

Food, Flavorings, Ingredients, Packaging and Processing (1983), 5(8), 18–23.

Food Addit. Toxicol. (1995), 210–14, Ghorpade et al.

JP 07079748–A Abstract (Mar. 1995).

* cited by examiner

*Primary Examiner*—Keith Hendricks
(74) *Attorney, Agent, or Firm*—Keil & Weinkauf

(57) ABSTRACT

The use of carotenoids as stabilizer of the color of riboflavin and/or riboflavin derivatives is described.

7 Claims, No Drawings

USE OF CAROTENOIDS AS STABILIZER OF THE COLOR OF RIBOFLAVIN AND RIBOFLAVIN DERIVATIVES

Use of carotenoids as stabilizer of the color of riboflavin and riboflavin derivatives The present invention relates to the use of carotenoids to stabilize the color of riboflavin and riboflavin derivatives.

Natural or nature-identical food colors are gaining increasing importance for coloring foods. A principal reason for this trend is without doubt the lack of acceptance by the consumers of synthetic food colors.

The best known representatives of natural or nature-identical food colors are, inter alia, carotenoids, in particular β-carotene, apocarotenal and canthaxanthin, as well as porphyrin pigments, anthocyans, beetroot red and riboflavin or riboflavin derivatives.

To color foods yellow, principally β-carotene or riboflavin are used from the variety of natural or nature-identical food colors. Whereas adding β-carotene gives a yellow-orange product, bright yellow to yellow-green hues may be achieved by using riboflavin. The two abovementioned colors thus provide the user with a broad range of different yellow hues.

Not only carotenoids but also riboflavin and their 5'-phosphate are suitable for coloring dairy products, for example yoghurt products and quark products [J. N. Counsell, C. J. Knewstubb, Food Flavourings, Ingredients, Packaging and Processing (1983) 5(8), 18–23 and V. M. Ghorpade, S. S. Deshpande, D. K. Salunkhe in Food. Addit. Toxicol. (1995), 210–214, Dekker, New York]

U.S. Pat. No. 4,689,245 describes pulverulent coffee creamers which are based on nonfat milk and whose "creaming power" was enhanced by adding β-carotene and riboflavin.

In addition, there are numerous patents in which, inter alia, β-carotene and riboflavin are used to vitaminize foods. Thus, JP 07079748-A describes a beverage which, in addition to sugar, raffinose and an algal extract, contains β-carotene and riboflavin in a ratio up to 1:40.

WO 94/06415 describes multivitamin preparations which can contain, inter alia, from 0 to 4500 I.U. of β-carotene and from 0 to 3.7 mg of riboflavin.

However, when riboflavin is used to give a yellow to yellow-green color to dairy products, it has been found that even after a storage time of one day, a significant decrease in color intensity occurs, up to complete decolorization of yoghurt. In addition, it has been found that this decolorizing process is reversible, that is the original hue reappears by vigorously shaking or stirring the yoghurt in the presence of atmospheric oxygen.

It is an object of the present invention, therefore to develop a color-stabilized riboflavin for coloring foods containing lactic acid bacteria, in which the abovementioned disadvantage, that is the decolorization of the foods, does not occur.

We have found that this object is achieved according to the invention by using carotenoids as stabilizer of the color of riboflavin and/or riboflavin derivatives.

The carotenoids which are used in the context of the invention are the known, accessible, natural or nature-identical representatives of this class of compounds, eg. β-carotene, astaxanthin, lycopene, bixin, zeaxanthin, cryptoxanthin, citranaxanthin, lutein, canthaxanthin, β-apo-4'-carotenal, β-apo-8'-carotenal. Particularly preferably, the carotenoids which are presently readily industrially accessible, such as β-carotene, astaxanthin, canthaxanthin, lycopene and β-apo-8'-carotenal, are used individually or as a mixture.

Riboflavin derivatives are, for example, phosphorylated compounds of riboflavin such as riboflavin 5'-phosphate.

Thus it has surprisingly been found that in foods, in particular in dairy products, in which the typically yellow to yellow-green hue has been established by adding riboflavin or riboflavin derivatives or their mixture, this yellow color due to adding β-carotene remains stable for at least 40 days.

The β-carotene used to stabilize the color of riboflavin or riboflavin derivatives is used in concentrations of from 0.05 to 30% by weight, preferably from 0.1 to 20% by weight, particularly preferably from 0.5 to 5% by weight, based on riboflavin and/or riboflavin derivatives. Said compounds may be either synthesized (nature-identical) material or products from natural sources (natural material).

An essential feature of the riboflavin/carotenoid combination used is that the carotenoid employed is preferably added to the foods in amounts at which it itself exhibits no coloring activity, but merely a color-stabilizing activity, and thus does not change the characteristic yellow color produced by riboflavin.

The abovementioned combination of riboflavin or riboflavin derivatives or their mixture and at least one carotenoid, in particular β-carotene, is suitable as coloring, in particular for foods, particularly preferably for dairy products, these being in particular preparations of fresh cheese, quark, kefir, set milk, buttermilk or yoghurt. In addition, icecream, desserts, milk drinks or salad dressings may likewise be colored by the abovementioned combination.

The invention further relates to premixes of food colors which comprise a) carotenoids, in particular β-carotene, and b) riboflavin or riboflavin derivatives or their mixture in a ratio (a:b) of from 1:25 to 1:1000, preferably from 1:30 to 1:1000, particularly preferably from 1:30 to 1:100.

These mixtures may be admixed with other components such as antioxidants, for example ascorbic acid and ascorbic acid derivatives, tocopherol or butylated hydroxytoluene, and other food colors, such as Sicovit® quinoline yellow 70 E 104, Sicovit® orange yellow 85 E 110, Sicovit® erythrosine 85 E 127 (all three from BASF), FD&C Yellow No. 5, FD&C Yellow No. 6 or FD&C Red No. 40.

These prepared mixtures of food colors can be employed directly by the user, for example the food industry, in particular dairies, for coloring their products.

However, it is also possible to add the carotenoid, in particular 5-carotene, and riboflavin or riboflavin derivatives or their mixture to the foods to be colored separately in the ratios mentioned above, in order to achieve color stability by this means.

The invention further relates to foods which comprise a) riboflavin-decolorizing microorganisms or other materials effecting the decolorizing of riboflavin, b) carotenoids, in particular β-carotene, and c) riboflavin or riboflavin derivatives or their mixture, the components b) and c) being present in a ratio of from 1:25 to 1:1000, preferably from 1:30 to 1:1000, particularly preferably from 1:30 to 1:100.

For the purposes of the invention, "microorganisms" mentioned under a) are, for example, yeasts or other microorganisms customary in milk products, in particular lactic acid bacteria.

The amount of riboflavin and/or riboflavin derivatives in the finished end product is from 5 to 200 ppm, preferably from 15 to 100 ppm, particularly preferably from 20 to 50 ppm.

The carotenoid used to stabilize the color of riboflavin is present in the end product at a concentration of from 0.1 to 3.0 ppm, preferably from 0.2 to 2.0 ppm.

The Examples below illustrate the invention, in particular the use of β-carotene to stabilize the color of riboflavin and riboflavin derivatives.

EXAMPLE 1
Preparation of a stock β-carotene solution 1 g of dry β-carotene powder (β-carotene 10% CWD, BASF) having a β-carotene content of 10% by weight was added slowly to the stirred surface of 99 ml of water and the mixture was stirred until a homogeneous dispersion formed. 1 mg (1 ml) of this stock solution per kg of end product is equivalent to a β-carotene concentration of 1 ppm.

EXAMPLE 2
Coloring of Yoghurt a. Comparison Sample:
 20 ppm of riboflavin were added to 200 g of natural yoghurt and the mixture was homogenized with a spoon. The light yellow-green yoghurt was packaged in jars with twist-off caps and stored in a refrigerator at 6° C.

b. Sample 1:
 20 ppm of riboflavin and 0.1 ml of the stock β-carotene solution (=0.5 ppm of β-carbtene) were added to 200 g of natural yoghurt and the mixture was homogenized with a spoon. The light yellow-green yoghurt was packaged in jars with twist-off caps and stored in a refrigerator at 6° C.

c. Sample 2:
 40 ppm of riboflavin and 0.2 ml of the stock β-carotene solution (=1 ppm of β-carotene) were added to 200 g of natural yoghurt and the mixture was homogenized with a spoon.

The yoghurt, which was somewhat more intensively colored than sample a. (but of the same hue) was packaged in jars with twist-off caps and stored in a refrigerator at 6° C.

d. Sample 3:
 50 ppm of riboflavin and 0.3 ml of the stock β-carotene solution (=1.5 ppm of β-carotene) were added to 200 g of natural yoghurt and the mixture was homogenized with a spoon. The yoghurt, which was somewhat more intensively colored than sample a. (but of the same hue) was packaged in jars with twist-off caps and stored in a refrigerator at 6° C.

Stability Test:
 All four yoghurt mixtures were kept in a refrigerator for a period of 40 days and their color was examined regularly.

Result:

a. Comparison sample:
 Even after one day of storage, decolorization of the lower yoghurt layers in the jar was observed.
 When decolorized yoghurt was removed and this sample was homogenized again, a yellow color with the original intensity developed again within from 30 to 60 seconds.
 No decolorization occurred around air bubbles at points where these were included in the yoghurt.

b. Sample 1:
 no color change after storage for 40 days c. Sample 2:
 no color change after storage for 40 days d. Sample 3:
 no color change after storage for 40 days

EXAMPLE 3
Coloring of Yoghurt a. Comparison Sample:
 170 g of natural yoghurt were admixed with a mixture of 30 g of fruit concentrate and 20 ppm of riboflavin, based on the total amount, and the mixture was homogenized with a spoon. The light yellow-green yoghurt was packaged in jars with twist-off caps and stored in a refrigerator at 6° C.

b. Sample 1:
 170 g of natural yoghurt were admixed with a mixture of 30 g of fruit concentrate, 20 ppm of riboflavin, based on the total amount, and 0.1 ml of the stock β-carotene solution (=0.5 ppm of β-carotene) and the mixture was homogenized with a spoon. The light yellow-green yoghurt was packaged in jars with twist-off caps and stored in a refrigerator at 6° C.

c. Sample 2:
 170 g of natural yoghurt were admixed with a mixture of 30 g of fruit concentrate, 40 ppm of riboflavin, based on the total amount, and 0.2 ml of the stock β-carotene solution (=1 ppm of β-carotene) and the mixture was homogenized with a spoon. The yoghurt, which was somewhat more intensely colored than sample a. (but of the same hue) was packaged in jars with twist-off caps and stored in a refrigerator at 6° C.

d. Sample 3:
 170 g of natural yoghurt were admixed with a mixture of 30 g of fruit concentrate, 50 ppm of riboflavin, based on the total amount, and 0.3 ml of the stock β-carotene solution (=1.5 ppm of β-carotene) and the mixture was homogenized with a spoon. The yoghurt, which was somewhat more intensely colored than sample a. (but of the same hue) was was packaged in jars with twist-off caps and stored in a refrigerator at 6° C.

Stability Test:
 In a similar manner to Example 2, all four yoghurt mixtures were kept in a refrigerator for 40 days and their color was examined regularly.

Result:
 The results of the color stability tests were identical to those of Example 2a to d.

We claim:

1. A method of stabilizing the color of riboflavin and riboflavin derivatives in a milk product selected from the group consisting of fresh cheese, quark, kefir, set milk, buttermilk and yogurt, which comprises adding from 0.1 to 2 mg of carotenoids per kg of milk product to the milk product, and wherein the carotenoids do not exhibit coloring activity, but do exhibit color-stabilizing activity.

2. The method of claim 1, wherein the concentration of carotenoids is from 0.5 to 1.5 ppm.

3. The method of claim 1 wherein the concentration of carotenoids is 0.5 ppm.

4. The method of claim 1 wherein the concentration of carotenoids is 1 ppm.

5. The method of claim 1 wherein the concentration of carotenoids is 1.5 ppm.

6. The method of claim 1, further comprising adding riboflavin and/or riboflavin derivative to the milk product such that the weight ratio of added carotenoids to added riboflavin and/or riboflavin derivative is from 1:25 to 1:1000.

7. A method of coloring and stabilizing the color of a milk product, said method comprising adding riboflavin and/or riboflavin derivatives to the milk product such that the amount of riboflavin and/or riboflavin derivative is from 5 to 200 ppm by weight based on the amount of milk product, and adding carotenoids to the milk product such that the ratio of carotenoids to riboflavin and/or riboflavin derivative in the milk product is from 1:25 to 1:1000 by weight, and wherein the carotenoids do not exhibit coloring activity, but do exhibit color-stabilizing activity.

* * * * *